Figure 1:
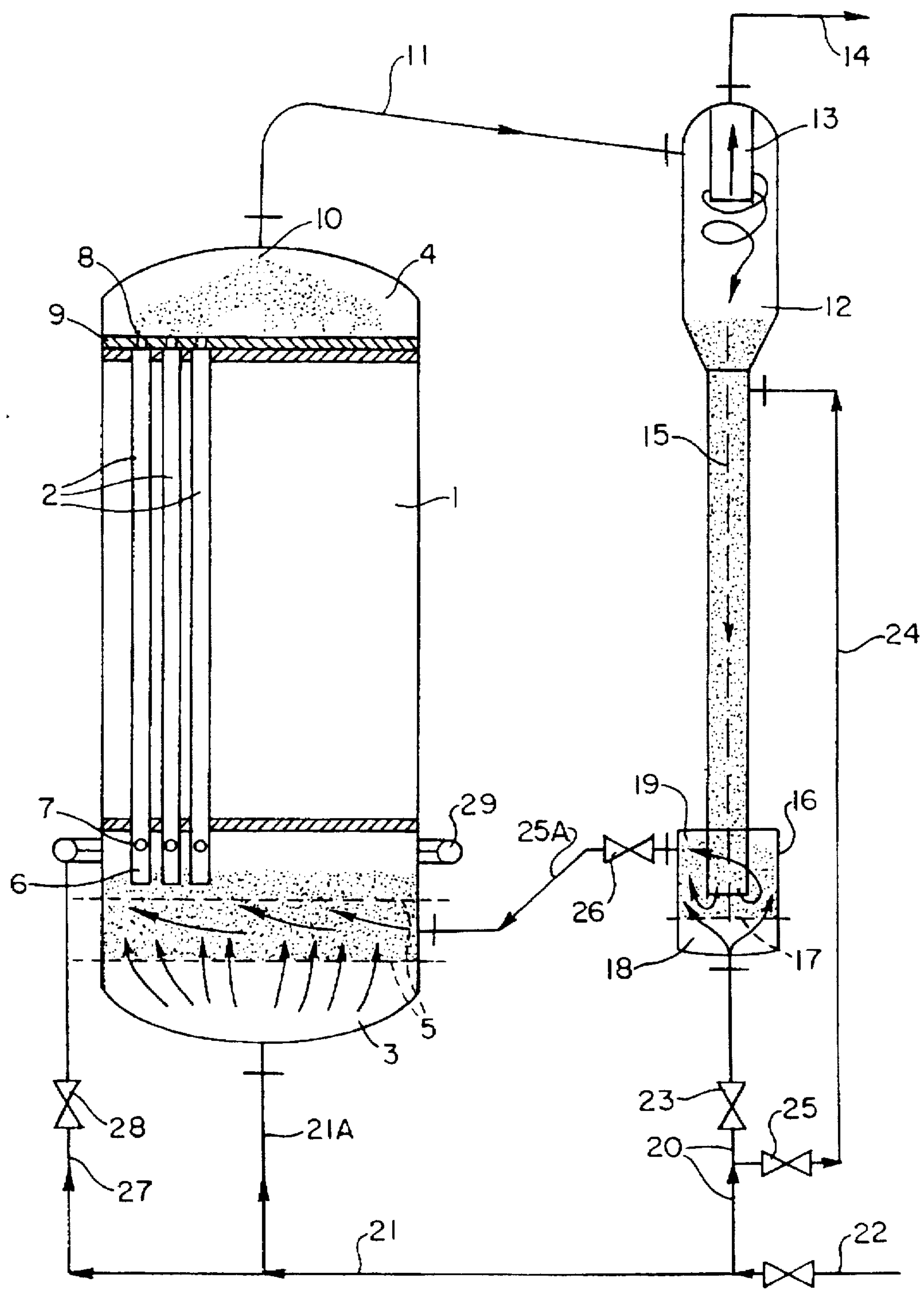

US005706884A

United States Patent [19]

Klaren

[11] Patent Number: 5,706,884

[45] Date of Patent: Jan. 13, 1998

[54] APPARATUS FOR CARRYING OUT A PHYSICAL AND/OR CHEMICAL PROCESS, SUCH AS A HEAT EXCHANGER

[75] Inventor: Dick Gerritt Klaren, Hillegom, Netherlands

[73] Assignee: Bronswerk Heat Transfer B.V., CG Nijkerk, Netherlands

[21] Appl. No.: 549,838

[22] PCT Filed: Apr. 19, 1994

[86] PCT No.: PCT/NL94/00081

§ 371 Date: Jan. 30, 1996

§ 102(e) Date: Jan. 30, 1996

[87] PCT Pub. No.: WO94/24507

PCT Pub. Date: Oct. 27, 1994

[30] Foreign Application Priority Data

Apr. 20, 1993 [NL] Netherlands .......................... 9300666

[51] Int. Cl.$^{6}$ ................................................ F28D 13/00

[52] U.S. Cl. .................... 165/104.16; 165/119; 110/245; 122/4 D; 422/147; 422/145

[58] Field of Search .............................. 165/119, 104.16, 165/109.1, 85; 122/4 D; 110/245, 266; 422/147, 145

[56] References Cited

U.S. PATENT DOCUMENTS

| | | | |
|---|---|---|---|
| 4,426,958 | 1/1984 | Hosek et al. | 122/4 D |
| 4,615,382 | 10/1986 | Klaren | 165/104.16 |
| 4,716,856 | 1/1988 | Beisswenger et al. | 165/104.16 X |
| 4,781,574 | 11/1988 | Taylor | 110/266 X |
| 4,955,295 | 9/1990 | Abdulally | 110/245 X |
| 5,141,708 | 8/1992 | Campbell, Jr. et al. | 165/104.16 X |
| 5,159,886 | 11/1992 | Schaub et al. | 110/245 X |
| 5,205,350 | 4/1993 | Hirsch et al. | 165/104.16 X |
| 5,218,932 | 6/1993 | Abdulally | 165/104.16 X |
| 5,308,585 | 5/1994 | Ströder et al. | 165/104.16 X |

FOREIGN PATENT DOCUMENTS

| | | |
|---|---|---|
| 0 065 332 | 11/1982 | European Pat. Off. . |
| 0 278 262 | 8/1988 | European Pat. Off. . |
| 0 413 611 | 2/1991 | European Pat. Off. . |
| 1350734 | 1/1964 | France . |
| 34 32 864 | 3/1986 | Germany . |
| 2087534 | 5/1982 | United Kingdom . |

*Primary Examiner*—Stephen M. Hepperle
*Assistant Examiner*—Christopher Atkinson
*Attorney, Agent, or Firm*—Merchant, Gould, Smith, Edell, Welter & Schmidt, P.A.

[57] ABSTRACT

An apparatus for carrying out a physical and/or a chemical process, such as a heat exchanger, a reservoir, in which a fluidized bed of granular material is present, is provided with upwardly directed tubes to a top box. Particles circulate up through the tubes, to a downcomer arranged outside the reservoir. The top of the downcomer is connected to a separating device, and the bottom of the downcomer opens into a collecting reservoir. The collecting reservoir communicates via a valve with the fluidized bed in the reservoir.

4 Claims, 2 Drawing Sheets

APPARATUS FOR CARRYING OUT A PHYSICAL AND/OR CHEMICAL PROCESS, SUCH AS A HEAT EXCHANGER

The invention relates to an apparatus for carrying out a physical and/or chemical process, such as a heat exchanger, comprising a reservoir provided with upwardly-directed tubes accommodated, at the top and bottom ends thereof, in tube plates, and which are in open communication with a top box and a bottom box, in which bottom box at least one distribution plate is arranged for supporting a fluidized bed consisting of granular material capable of being held in a quasi-stationary, fluidized condition by means of a medium to be treated or heated which is supplied via the bottom box and flows through the tubes, which apparatus further comprises means for feeding fluidized bed particles back from the top box to the bottom box in the form of a downcomer arranged outside the reservoir and connected, at the top end thereof, to the top box by means of a separating device, and whose bottom end, through switching on and off, is communicable with the bottom box of the reservoir.

Such an apparatus is disclosed in GB-A-2 087 534. In the apparatus known from FIG. 3 of that publication, a valve construction is built in in the downcomer, which valve construction consists of an upper and lower conical valve member interconnected by a valve stem extending in the longitudinal direction of the downcomer. The passage of the downcomer is closed by either the upper or the lower valve member. If the lower valve member is in the closed position, an amount of fluidized bed particles collects on that valve member until the weight of that amount becomes so great that the valve member is pressed downward into its open position, which at the same time means that the upper valve member is moved into the closed position. By opening the lower valve member, the amount of fluidized bed particles collected thereon will flow away in the direction of the bottom box of the reservoir. As a result, the lower valve member is unloaded, the valve construction being such that after a certain amount of fluidized bed particles has flowed away, the lower valve member moves toward its higher closed position again, as does the upper valve member, connected therewith via the valve stem, which upper valve member reaches the open position again, so that fluidized bed particles collected at that location fall toward the closed lower valve member. In this manner, a cyclic, intermittent recirculation of the fluidized bed particles is obtained. Practice has shown that the upward and downward movement of the valve members, connected by means of the valve stem, may take place jerkily, causing adverse shocks on or vibrations in the apparatus. Further problems may occur due to the fact that the two valve members operate in an abrasive environment, i.e. the fluidized bed particles may give rise to a quick and premature wear and replacement of the valve members and their seats. The intermittent action further results in a low circulation capacity of the fluidized bed particles, which in turn may lead to the necessity of using several downcomers.

The objects of the invention is to provide an apparatus of the type described hereinabove, wherein the drawbacks mentioned have been overcome. According to the invention, this object is realized in that the bottom end of the downcomer opens into a collecting reservoir which, by means of a distribution plate, is divided into a top and a bottom section, the bottom section being closably connected, by means of a conduit, to the feed line for the medium to be treated, and the bottom end of the downcomer opening into the top section connected, via a conduit, to the bottom box of the reservoir.

In this manner, an apparatus is obtained which allows the fluidized bed particles to be continuously fed back from the top box to the bottom box by conveying the fluidized bed particles located in the top section of the collecting reservoir to the bottom box of the reservoir by means of the medium fed via the bottom section. The relevant process parameters can be measured on the downcomer in a simple manner with known, available equipment. By closing off the feed of medium to the bottom section, the heat exchanger may also be operated without recirculation of fluidized bed particles, which provides a fall-back position which is usually desired by users. By closing off the medium feed, the fluidization effect generated thereby will stop, as a result of which the fluidized bed particles in the top section will immediately start forming a more compact mass such that the flow-back to the bottom box of the reservoir is stopped. This will also involve the collapse of the column of fluidized bed particles, creating, as it were, a "stoppage" of the recirculation circuit.

Under certain circumstances, it could occur that when the medium feed to the bottom section is closed off, the recirculation does not stop, due to the fact that a natural circulation flow establishes itself in the apparatus. In that case, in accordance with a further embodiment of the invention, it is preferred that parallel to the downcomer, between the separating device and the feed line, a bypass line with a stop valve is arranged. By feeding medium at the top end of the downcomer, the fluidized bed particles are retained in the separating device and the fluidized bed particles which are already present in the downcomer are compacted, so that a natural circulation, if any, is stopped. Such a feed of medium may also be effected for causing, in cases without natural circulation, the recirculation of fluidized bed particles to stop more quickly than in the case where the feed of medium is only closed off at the bottom section of the collecting reservoir.

Further elaborated embodiments of the apparatus according to the invention have been laid down in the subclaims.

Figure 2:
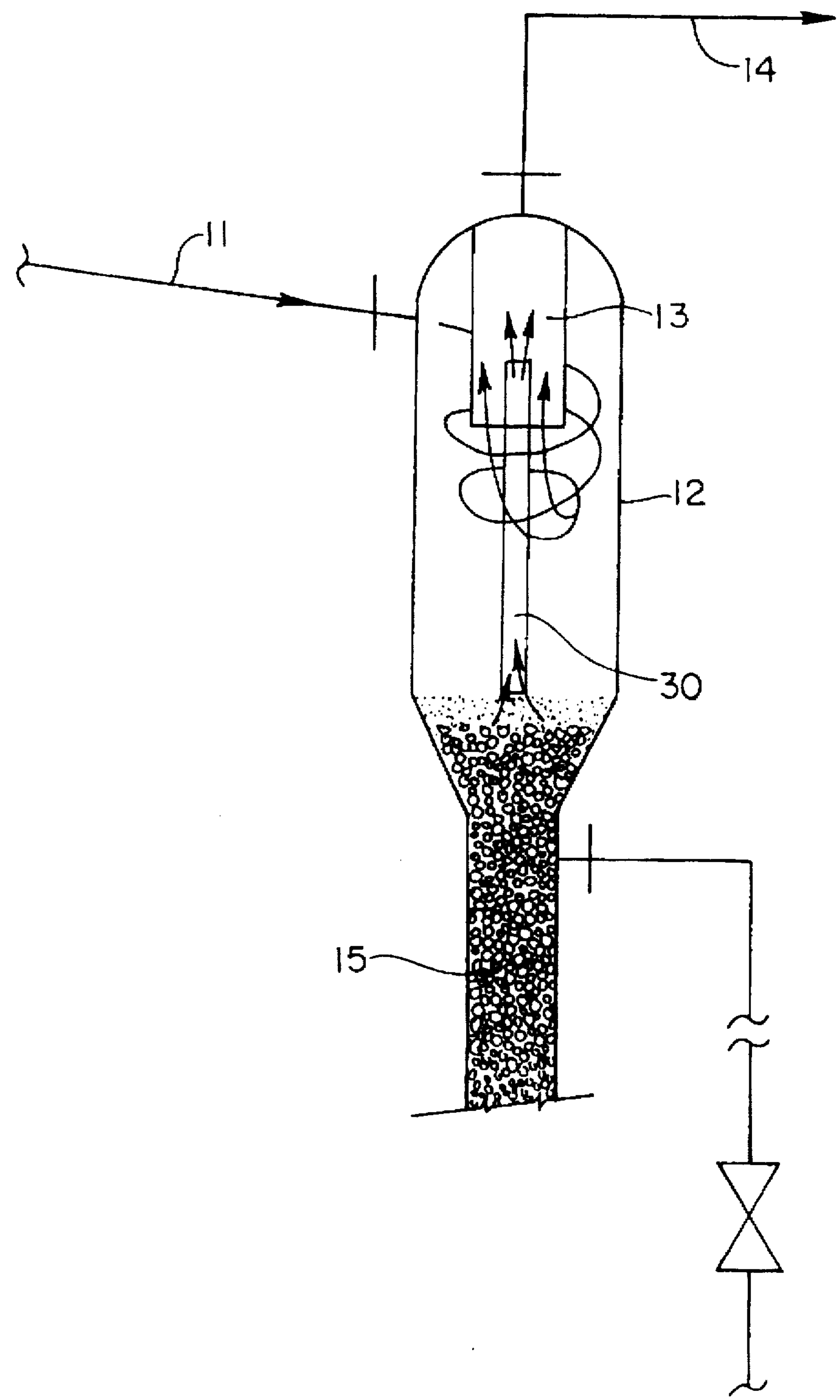

An embodiment of the apparatus according to the invention is further explained with reference to the accompanying drawings. In these drawings:

FIG. 1 shows a heat exchanger with external circulation of fluidized bed particles; and FIG. 2 shows a detail of the separating device, used in the apparatus according to FIG. 1.

FIG. 1 shows a heat exchanger consisting of a reservoir 1, wherein a series of riser pipes 2 are arranged, accommodated, at the top and bottom ends thereof, in pipe plates. Above the top pipe plate, a top box 4 is located, into which the riser pipes 2 open, while under the bottom pipe plate a bottom box 3 is present, wherein one or more distribution plates 5 are arranged for supporting a fluidized bed consisting of granular material. At the bottom ends, the riser pipes 2 comprise an inlet piece 6, wherein openings 7 are provided. On top of or at a short distance from the top pipe plate, a throttling plate 9 is arranged, provided with openings 8, which openings are in register with the openings of the riser pipes 2 but have a smaller diameter than the internal diameter of the riser pipes 2. Located in the top box 4 is an outlet opening 10, to which an outlet line 11 is connected, while the medium to be treated or heated is fed to the bottom box 3 via a conduit 21, 21A. Of course, between the top and bottom pipe plate, the reservoir 1 comprises an inlet stub and an outlet stub for respectively feeding and discharging the heating medium to and from the heat exchanger. The heat exchanger can, of course, also be used as a cooling apparatus. The reservoir 1 as described hereinabove corresponds to the known apparatus according to EP-B-0.065.333, while the downcomers of the known apparatus have been omitted.

The external recirculation system for fluidized bed particles and fluid consists of a separating device 12 connected to the outlet line 11. Arranged at the bottom end of the separating device 12 is a downcomer 15 whose bottom end opens into a collecting reservoir 16, divided, by means of a distribution plate 17, into a bottom section 18 and a top section 19. The bottom section 18 is connected, by means of a conduit 20, to the feed line 22 for the medium to be treated or heated. In the conduit 20, a stop valve 23 is arranged. Via one or more conduit 25A, the top section 19 of the collecting reservoir 16 is connected to the bottom box 3 of the reservoir 1 for feeding fluidized bed particles from the collecting reservoir 16 back thereto. In each conduit 25A, a stop valve 26 is arranged. The feed line 22 is further connected to the bottom box 3 of the reservoir 1 by means of the conduit 21, 21A.

Located within the separating device 12 is a pipe 13 connected to a discharge line 14 for discharging the medium heated by the heat exchanger 1. A portion of this medium, together with recirculated fluidized bed particles, ends up in the downcomer 15.

Parallel to the downcomer 15, a bypass line 24 is arranged comprising a stop valve 25. The conduit 24 connects the bottom end of the separating device 12 to the feed line 20.

Operating the Apparatus According to the Invention

In the case of switched-on, external recirculation—the stop valves 26, 23 are in the open position, the stop valve 25 in the conduit 24 is closed—the apparatus operates as follows:

The larger portion of the medium to be treated, fed via the feed line 22, ends up, via the conduit 21, 21A, in the inlet box 3 of the reservoir 1, under the bottom distribution plate 5. The medium fed flows through the fluidized bed resting on the bottom distribution plate, which fluidized bed is brought into a fluidized condition. In and through the fluidized bed, the medium fed is evenly distributed over the riser pipes 2, in which riser pipes fluidized bed particles are located as well. Via the constricted openings 8 in the throttling plate 9, the fluid, which has in the meantime been treated or heated, or cooled, ends up, together with fluidized bed particles which are discharged from the riser pipes 2, in the top box 4 and subsequently in the separating device 12 via the outlet opening 10 and the conduit 11, a portion of the treated fluid being suctioned out into the conduit 14 via the tube 13, while fluidized bed particles and a portion of the treated fluid end up, via the separating device 12, in the external downcomer 15 and are fed via this downcomer 15 to the top section 19 of the collecting reservoir 6. Via the line 20 and the opened stop valve 23, a portion of the main stream, fed via the conduit 22, ends up in the bottom section 18 and subsequently, via the distribution plate 17, in the top section 19. This portion of the main stream entrains the fluidized bed particles present in the top section 19, in the conduits 25A, via which conduits the thus recirculated particles end up in the fluidized bed present in the reservoir 1.

The relevant process parameters can be measured in a simple manner on the downcomer by means of known equipment. Important are the temperature of the downcomer 15, the volume flow within this downcomer and the pressure difference occurring therein.

Switching Off the Recirculation System

If it is desired that the external circulation of the fluidized bed particles is stopped, the stop valve 23 in the conduit 20 is closed, so that the main stream is fed to the bottom box 3 of the heat exchanger 1 via the conduit 21, 21A exclusively. The fluidized bed particles entrained in the riser pipes 2 by this main stream collect in the downcomer 15 and the collecting reservoir 16, from which they are now no longer discharged because the stop valve 23 is closed. In the top section 19 of the collecting reservoir 16 and the downcomer 15, a packed bed of fluidized bed particles is formed. In course of time, the circulation of fluidized bed particles stops. This process can be accelerated by not only closing the stop valve 23, but also opening the stop valve 25, so that a portion of the main stream is fed via the conduit 24 to the bottom end of the separating device 12, as a consequence of which the fluidized bed particles in the separating device 12 are retained. If necessary, the stop valves 26 can be closed as well. In course of time, recirculation of the fluidized bed particles no longer takes place and the heat exchanger 1 functions as a "normal" heat exchanger, wherein the medium to be treated or heated is heated and dirt can deposit on the inner surface of the riser pipes, until, after a period fixed by experiment, the recirculation is switched on again.

If a switched-off recirculation apparatus is being employed for a longer period, a compression of fluidized bed particles will occur in the collecting reservoir 16 or the downcomer 15. The thus formed packed bed could possibly cause problems when the external recirculation system is switched on again. In order that this packed bed can be discharged more easily, a vibrating motor may be arranged on the downcomer 15. The downcomer 15 may be made slightly divergent in the flow-through direction. Instead of making the downcomer itself divergent, a rod may be arranged in the cylindrical downcomer 15, which rod is slightly conical in the flow direction and can be vibrated by means of a motor. In this manner, in the case of a densely packed bed, the start of the circulation apparatus can be facilitated.

Limitation of the Flow Rates in or Through the Fluidized Bed

For a proper distribution of fluid and fluidized bed particles over the riser pipes 2, it is desirable to have a reasonably heavy particle bed, i.e. a fluidized bed having a porosity of approximately 65%. When a volume flow in the conduits 21, 21A increases, it is possible that the medium rate above the distribution plates 5 becomes too high, as a consequence of which all particles of the fluidized bed would be blown away from the bottom box 3. In order to maintain an active fluidized bed even in the case of great volume flows, a portion of the volume flow is preferably fed via a ring line 29, located at the height of the inlet pieces 6 of the riser pipes 2 and adapted to feed, via a series of connecting points, a portion of the fed volume flow to the top side of the inlet box 3 above the fluidized bed. Via a branch line 27 with a stop valve 28 arranged therein, the ring line 29 is connected to the main feed line 21, 22. In this manner, a much lower volume flow is fed to the inlet box 3, so that a well-fluidized bed can be maintained above the distribution plates 5 and, also, a lower entrance velocity of the medium in the inlet pieces 6 of the riser pipes 2 is obtained. The acceleration of the fluid in the riser pipes 2 now takes place through the volume flow fed via the ring line 29, which is fed to the riser pipes 2 via the openings 7 in the inlet pieces 6.

When the circulation process in the downcomer 15 is switched off, impurities, for instance crystals from the fluid or dirt deposits removed from the riser pipes 2, may collect on the packed bed present therein, which will usually extend into the separating device 12. It is desired that these impurities are removed as much as possible, also during inactive circulation in the downcomer 15. A possibility for this is shown in FIG. 2. The packed bed present in the downcomer 15 extends into the separating device and located on top of this heavy, packed bed is a layer of impurities. In order to separate this lighter layer from the heavy bed, the stop valve 25 in the conduit 24 can be opened, as a result of which an upward flow takes place through the packed bed formed in the separating device 12. As a result of this flow, the relatively light impurities are "washed" from the heavy, packed bed material, or a classification takes place to the effect that the lighter dirt remains sitting on top of the heavy, packed bed material. The buildup of this layer of dirt can be limited by arranging a suction tube 30 within the separating device 12, to which suction tube 30, preferably, a small pump is connected. If desired, this dirt can also be discharged utilizing the pressure difference occurring in the separating device 12.

I claim:

1. An apparatus for carrying out a physical and/or chemical process, such as a heat exchanger, comprising a reservoir provided with upwardly-directed tubes accommodated, at top and bottom ends thereof, in tube plates, the tubes being in open communication with a top box and a bottom box, at least one distribution plate arranged in said bottom box for supporting a fluidized bed of granular material capable of being held in a quasi-stationary, fluidized condition by a medium to be treated or heated which is supplied via the bottom box and which flows through the tubes, means for feeding fluidized bed particles back from the top box to the bottom box including a downcomer arranged outside the reservoir and connected, at a top end thereof, to the top box by a separating device, and at a bottom end thereof, through a valve, to the bottom box of the reservoir, wherein the bottom end of the downcomer opens into a collecting reservoir which is divided into a top and a bottom section by a distribution plate, the bottom section being closably connected by a conduit to a feed line feeding the medium to be treated, and the bottom end of the downcomer opens into the top section, the top section being connected, via a conduit, to the bottom box of the reservoir.

2. An apparatus according to claim 1, wherein a bypass line having a stop valve is arranged parallel to the downcomer between the separating device and the feed line.

3. An apparatus according to claim 1, wherein a cross section of the downcomer is divergent in a flow-through direction.

4. An apparatus according to claim 1, further comprising a suction tube provided in the separating device to discharge impurities collected therein.

* * * * *